(12) United States Patent
Minegishi et al.

(10) Patent No.: US 8,179,522 B2
(45) Date of Patent: May 15, 2012

(54) DISTANCE MEASURING DEVICE

(75) Inventors: Isao Minegishi, Tokyo (JP); Masahiro Ohishi, Tokyo (JP); Naoto Miki, Tokyo (JP); Yuichi Yoshimura, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 13/223,888

(22) Filed: Sep. 1, 2011

(65) Prior Publication Data
US 2012/0033197 A1 Feb. 9, 2012

Related U.S. Application Data

(63) Continuation of application No. PCT/JP2010/052970, filed on Feb. 25, 2010.

(30) Foreign Application Priority Data

Mar. 3, 2009 (JP) ................................ 2009-049016

(51) Int. Cl.
*G01C 3/08* (2006.01)
(52) U.S. Cl. .............. 356/5.01; 356/3.01; 356/4.01; 356/5.1; 356/5.15
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

7,394,548 B2 * 7/2008 Kim et al. ................. 356/487

FOREIGN PATENT DOCUMENTS

| JP | 63-017482 U | 2/1988 |
| JP | 2003-344464 A | 12/2003 |
| JP | 2006-184181 A | 7/2006 |
| JP | 2006-300453 | * 11/2006 |
| JP | 2006-300753 A | 11/2006 |

OTHER PUBLICATIONS

International Search Report for International Application No. PCT/JP2010/052970, dated Apr. 13, 2010, 2 pages.

* cited by examiner

*Primary Examiner* — Thomas Tarcza
*Assistant Examiner* — Luke Ratcliffe
(74) *Attorney, Agent, or Firm* — Brinks Hofer Gilson & Lione (57) ABSTRACT

A distance measuring device measures a distance from a phase difference of beaten down processing signals even when fluctuations occur in a frequency of an oscillator. The distance measuring device includes a laser unit, a dividing device, a reference light receiving unit, and a measuring light receiving unit. The distance measuring device further includes an oscillator, a first mixer, a second mixer, a fourth filter, a fifth filter, a third mixer, a sixth filter, a second filter, a phase difference measuring unit, and a distance measuring unit. The phase difference measuring unit measures a phase difference of the two beat signals extracted by the sixth filter and the second filter. The distance measuring unit measures a distance based on the phase difference measured by the phase difference measuring unit.

7 Claims, 7 Drawing Sheets

DISTANCE MEASURING DEVICE

RELATED APPLICATIONS

This application is a continuation of PCT/JP2010/052970 filed on Feb. 25, 2010, which claims priority to Japanese Application No. 2009-049016 filed on Mar. 3, 2009. The entire contents of these applications are incorporated herein by reference.

BACKGROUND OF THE INVENTION

1. Field of the Invention

The present invention relates to a distance measuring device for measuring a distance from a phase difference of at least two periodic signals by using an optical frequency comb. Specifically, the present invention relates to a distance measuring device for measuring a distance even when fluctuations occur in the frequency of an oscillator. In this case, the oscillator is used for beating down the frequency of a periodic signal.

2. Description of the Related Art

A distance measuring device using a femtosecond mode-locked pulse laser is known (for example, Japanese Unexamined Patent Application Publication No. 2006-184181). The mode-locked pulse laser has frequency spectra that line up at regular intervals in a cyclic frequency of optical pulses and that are made of multiple discrete spectra (in a longitudinal mode) in which the phases between modes are aligned. Since multiple longitudinal modes at precise intervals line up in the form of teeth of a comb, the optical pulses are called an "optical frequency comb". In a distance measuring device using the optical frequency comb, a laser is irradiated on an object, and the light reflected by the object is received by a light receiving element. Then, a frequency component having high resolution for measuring a distance is selected from frequency components in large spectrum width, and this selected frequency component is used as a measuring tool. The optical frequency comb is referred to in the article "A New Optical Measuring Tool", http://www.aist.go.jp/aist_j/museum/keisoku/komu/komu.html.

Figure 9:
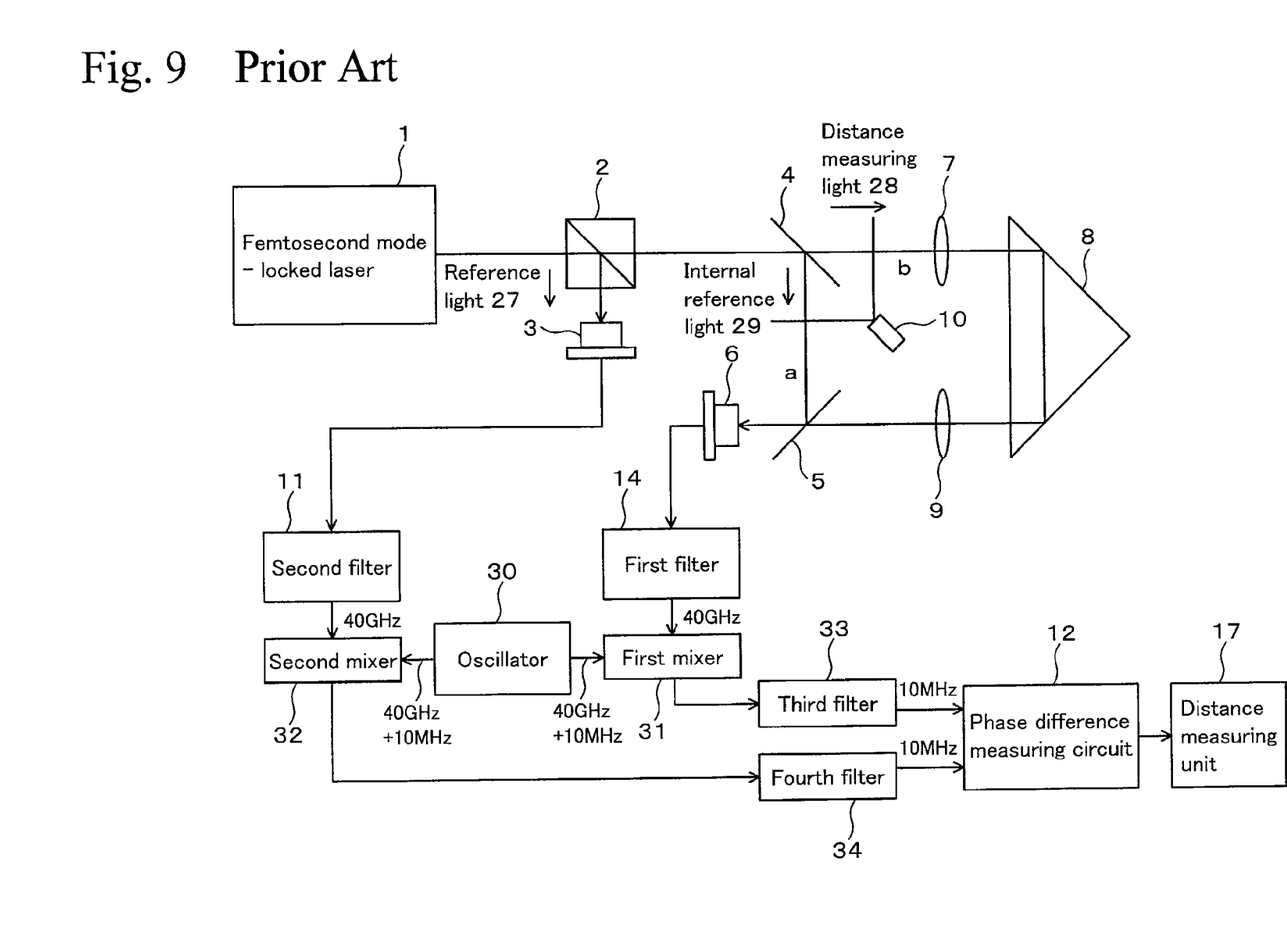
FIG. 9 is a block diagram of a conventional distance measuring device.

The distance measuring device disclosed in Japanese Unexamined Patent Application Publication No. 2006-184181 is shown in FIG. 9. The distance measuring device includes a laser unit 1, a dividing device 2, a reference light receiving unit 3, and a measuring light receiving unit 6. The dividing device 2 divides a laser light from the laser unit 1 into reference light and distance measuring light. The reference light receiving unit 3 receives the reference light and outputs multiple beat signals. The measuring light receiving unit 6 receives the distance measuring light and outputs multiple beat signals. The distance measuring device further includes a first filter 14, a second filter 11, an oscillator 30, a first mixer 31, a second mixer 32, and a phase difference measuring circuit 12. The first filter 14 extracts components including a frequency component for measuring a distance, from a received light signal in the measuring light receiving unit 6. The second filter 11 extracts components including a frequency component for reference, from a received light signal of the reference light receiving unit 3. The frequency components from the first filter 14 and the second filter 11 (for example, around 40 GHz) are multiplied by a frequency (40 GHz+10 MHz) at the first mixer 31 and the second mixer 32. This frequency (40 GHz+10 MHz) is slightly different from the frequency components from the first filter 14 and the second filter 11 and is oscillated by the oscillator 30. As a result, the frequency components from the first filter 14 and the second filter 11 are beaten down to low frequency components (10 MHz) (local oscillator method). The low frequency components are input to the phase difference measuring circuit 12 as a distance measuring signal and a reference signal.

In this case, there may be a case in which the oscillator 30 generates a frequency having time fluctuations. If the time fluctuations occur, fluctuations are also generated in the frequencies of the distance measuring signal and the reference signal that are beaten down.

For example, when a frequency of the oscillator 30 has fluctuations of ±100 ppm, the variation of the frequency is ±4 MHz. Therefore, frequencies of processing signals that are beaten down by the first mixer 31 and the second mixer 32 vary from 6 to 14 MHz. Thus, even when the time fluctuations of the oscillator 30 are reduced to approximately ±10 ppm with respect to the frequency (40 GHz) extracted from the received light signal, large fluctuations are generated in a signal that is beaten down. In this case, the variation of the frequency of the signal is ±400 kHz with respect to 10 MHz. Therefore, the frequency of the processing signal varies, and extraction of frequency components by a filter becomes difficult, whereby it is difficult to measure a phase difference between the processing signals. Accordingly, an oscillator having high accuracy, which generates a frequency having greatly decreased fluctuations, is required.

SUMMARY OF THE INVENTION

In view of these circumstances, an object of the present invention is to provide a distance measuring device. In the present invention, frequencies are extracted from an optical frequency comb and are beaten down by an oscillator by a local oscillator method. The distance measuring device of the present invention measure a distance from the phase difference between beaten down processing signals even when fluctuations occur in the frequency of the oscillator.

In the invention according to claim 1, the present invention provides a distance measuring device including a laser unit, a dividing device, a reference light receiving unit, and a measuring light receiving unit. The distance measuring device further includes an oscillator, a first mixer, a second mixer, a fourth filter, a fifth filter, a third mixer, a sixth filter, a second filter, a phase difference measuring unit, and a distance measuring unit. The laser unit generates an optical frequency comb as a laser light flux. The dividing device divides the laser light flux into reference light and distance measuring light. The reference light receiving unit receives the reference light and outputs multiple beat signals. The measuring light receiving unit receives the distance measuring light and outputs multiple beat signals having frequency components to be extracted. The oscillator oscillates a periodic signal having a frequency that is different from the frequency components extracted from the beat signal of the measuring light receiving unit. The first mixer generates sum and difference frequency components of the beat signal from the measuring light receiving unit and the periodic signal oscillated by the oscillator. The second mixer generates sum and difference frequency components of the beat signal from the reference light receiving unit and the periodic signal oscillated by the oscillator. The fourth filter extracts a beat signal having the difference frequency component from the frequency components generated by the first mixer. The fifth filter extracts a beat signal having a frequency component, which is different from the frequency component extracted by the fourth filter, from the frequency components generated by the second mixer. The third mixer generates sum and difference frequency components of the beat signal extracted by the fourth filter and the beat signal extracted by the fifth filter. The sixth filter extracts a beat signal having the difference frequency component from the frequency components generated by the third mixer. The second filter extracts a beat signal having the same frequency component as the frequency component extracted by the sixth filter, from the beat signals of the reference light receiving unit. The phase difference measuring unit measures a phase difference of the two beat signals extracted by the sixth filter and the second filter. The distance measuring unit measures a distance based on the phase difference measured by the phase difference measuring unit.

In the invention according to claim 1, even when fluctuations occur in the frequency of the oscillator, the frequencies of the beaten down processing signals do not vary. Therefore, a distance is measured from the phase difference between the processing signals.

In the invention according to claim 2, in the invention according to claim 1, the first mixer and the second mixer immediately multiply the multiple beat signals from the measuring light receiving unit and the reference light receiving unit by the periodic signal of the oscillator, respectively.

In the invention according to claim 2, filters are not required for the multiple beat signals from the measuring light receiving unit and the reference light receiving unit. Therefore, the distance measuring device can be made to have a simple structure.

In the invention according to claim 3, in the invention according to claim 1, the frequency of the oscillator has a difference of $1/n$ ($n \neq 1, 2$) of frequency interval of the optical frequency comb with respect to the beat signal of the measuring light receiving unit.

In the invention according to claim 3, when the first mixer and the second mixer multiply the beat signals by the periodic signal of the oscillator, signal components, in which predetermined frequency components are maintained, are generated. In this case, the beat signals are from the measuring light receiving unit and the reference light receiving unit, respectively. Therefore, the predetermined frequency components are suitably beaten down.

In the invention according to claim 4, in the invention according to claim 1, the frequency of the oscillator has a difference of $1/4$ of frequency interval of the optical frequency comb with respect to the beat signal of the measuring light receiving unit.

In the invention according to claim 4, when the first mixer and the second mixer multiply the beat signals by the periodic signal of the oscillator, signal components having frequency spectra at equal interval are generated. In this case, the beat signals are from the measuring light receiving unit and the reference light receiving unit, respectively. Therefore, predetermined frequency components are easily extracted from the signal components.

In the invention according to claim 5, in the invention according to claim 1, the signal components generated by the first mixer and the second mixer have frequency spectra at equal interval.

In the invention according to claim 5, predetermined frequency components are easily extracted from the signal components generated by the first mixer and the second mixer.

In the invention according to claim 6, in the invention according to claim 1, the distance measuring device further includes a first filter and a third filter. The first filter extracts at least one beat signal from the measuring light receiving unit. The third filter extracts at least one beat signal from the reference light receiving unit. In this case, the first mixer generates sum and difference frequency components of the beat signal from the first filter and the periodic signal oscillated by the oscillator. The second mixer generates sum and difference frequency components of the beat signal from the third filter and the periodic signal oscillated by the oscillator.

In the invention according to claim 6, even when fluctuations occur in the frequency of the oscillator, the frequencies of the beaten down processing signals do not vary. Therefore, a distance is measured from the phase difference between the processing signals.

In the invention according to claim 7, in the invention according to claim 6, the frequency of the oscillator is different from ranges of frequencies passed through the first filter and the third filter.

In the invention according to claim 7, the frequency of the oscillator does not overlap the frequency components of the beat signals extracted by the first filter and the third filter. Therefore, when the first mixer and the second mixer multiply the beat signals by the periodic signal of the oscillator, signal components, in which predetermined frequency components are maintained, are generated. In this case, the beat signals are extracted by the first filter and the third filter, respectively. Accordingly, the predetermined frequency components are suitably beaten down.

In the present invention, the frequencies are extracted from the optical frequency comb and are beaten down by the oscillator by the local oscillator method. According to the present invention, even when fluctuations occur in the frequency of the oscillator, a distance can be measured from the phase difference between the beaten down processing signals.

DETAILED DESCRIPTION OF THE PREFERRED EMBODIMENTS

1. First Embodiment

An example of a distance measuring device will be described with reference to the drawings hereinafter.

Figure 1:
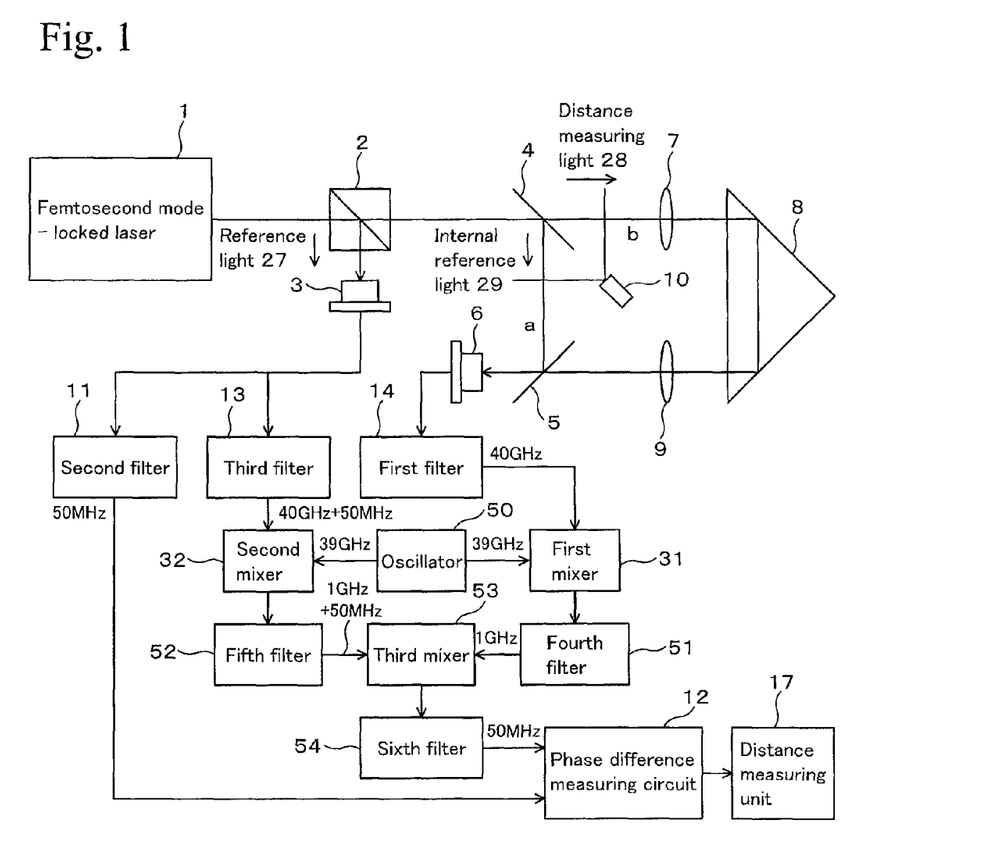
FIG. 1 is a block diagram of a distance measuring device relating to a first embodiment.

FIG. 1 is a block diagram of a distance measuring device relating a First Embodiment. The distance measuring device includes a femtosecond mode-locked laser unit 1, a dividing device 2, a reference light receiving unit 3, a half mirror 4, a half mirror 5, a measuring light receiving unit 6, a lens 7, a corner cube 8, a lens 9, and a chopper 10. The distance measuring device further includes a second filter 11, a third filter 13, a first filter 14, an oscillator 50, a first mixer 31, a second mixer 32, a fourth filter 51, a fifth filter 52, and a third mixer 53. The distance measuring device further includes a sixth filter 54, a phase difference measuring circuit 12, and a distance measuring unit 17. The distance measuring device is a femtosecond comb distance meter using an optical frequency comb and measures a distance from the distance measuring device to a corner cube 8 provided to a target object.

The femtosecond mode-locked laser unit 1 outputs pulses at regular intervals, and the pulses have extremely short pulse width of femtosecond. Each pulse has wide frequency spectra. The frequency spectra line up at regular intervals in a cyclic frequency of optical pulses and are made of multiple discrete spectra (in a longitudinal mode) in which the phases between modes are aligned. Since multiple longitudinal modes at precise intervals line up in the form of the teeth of a comb, the optical pulses are called an "optical frequency comb".

The femtosecond mode-locked laser unit 1 includes, for example, an excitation light source, an optical fiber, an optical isolator, a saturable absorber, and an optical coupler. As the excitation light source, a semiconductor laser for excitation, such as a laser diode, is used. As the optical fiber, a single-mode optical fiber, in which a rare-earth ion such as erbium is doped, is used. The optical fiber is formed into a ring shape and is thereby used as a resonator. In the ring resonator, the optical isolator, the saturable absorber, and the optical coupler are arranged.

The light from the excitation light source enters the optical fiber. The optical isolator prevents reflection of the light that enters the resonator. The saturable absorber absorbs light having low intensity and is saturated by light having high intensity. Therefore, a phase in each mode is temporarily synchronized with each other, and the phase differences are made to be the same (mode-locking). The light of each mode interferes with the others in the resonator, whereby femtosecond ultrashort pulses are oscillated in multiple modes. The optical coupler extracts optical pulses from the ring resonator.

As the mode-locking method, a passive mode locking, in which the saturable absorber is inserted in the resonator, may be used. Alternatively, a forced mode locking by an optical modulator may be used. The optical modulator modulates light in the resonator at a cyclic frequency that is equal to a natural number multiple of an inverse number of the round-trip time of light in the resonator.

For example, it is assumed that the femtosecond mode-locked laser unit 1 has a resonator with a length L of 4 m, the optical fiber has a refractive index "n" of 1.5, and light speed "c" in a vacuum is $3\times10^8$ m/s. In this case, according to the following formula, a round-trip time "T" of the light in the ring resonator is 20 ns, and the cyclic frequency "fr" of the optical pulse is 50 MHz.

$$T = \frac{nL}{c} \quad \text{First Formula}$$

$$fr = \frac{1}{T}$$

The light flux from the femtosecond mode-locked laser unit 1 is divided by the dividing device 2 into reference light 27 and light flux for measuring a distance (distance measuring light 28 and internal reference light 29). The reference light 27 is in the direction of the reference light receiving unit 3. The reference light 27 is received by the reference light receiving unit 3 and is converted to a reference signal used for comparing phases with the light flux for measuring distance.

The light flux for measuring distance is divided by the half mirror 4 into distance measuring light 28 and internal reference light 29. The internal reference light 29 is reflected by the half mirror 5 and enters the measuring light receiving unit 6. The distance measuring light 28 passes through the lens 7 and is reflected by the corner cube 8 of the target object. The reflected distance measuring light 28 passes through the lens 9 and then passes through the half mirror 5. Then, the distance measuring light 28 is received by the measuring light receiving unit 6 and is converted to a distance measuring signal.

The distance measuring light 28 and the internal reference light 29 are alternately changed by the chopper 10. By obtaining a difference between measured distance values before and after the alternation by the chopper 10, a distance of the difference between an internal reference light path "a" and an external measuring light path "b" is measured.

Next, a method of signal processing will be described. The second filter 11 extracts a frequency component for measuring a phase difference, from a received light signal of the reference light receiving unit 3. In this case, a frequency component equal to a cyclic frequency of the light pulse (frequency interval of the optical frequency comb, for example, 50 MHz) is extracted. The reference signal from the second filter 11 enters the phase difference measuring circuit 12.

The first filter 14 extracts frequency components (around 40 GHz) including a first high frequency component (for example, 40 GHz) for measuring a distance, from the received light signal in the measuring light receiving unit 6. The third filter 13 extracts frequency components (40 GHz+ around 50 MHz) including a second high frequency component (for example, 40 GHz+50 MHz) from the received light signal of the reference light receiving unit 3. The second high frequency component is slightly different from the first high frequency component extracted by the first filter 14. In this case, the "slight difference" is a difference of the frequency interval of the optical frequency comb (50 MHz). However, the second frequency component is not limited thereto and may have a difference of the frequency of the component extracted by the second filter 11.

The oscillator 50 outputs a single high frequency component (39 GHz) to the first mixer 31 and the second mixer 32. The single high frequency component is sufficiently different from the first frequency component (40 GHz) and the second high frequency component (40 GHz+50 MHz). In this case, the "sufficient difference" is a difference of not less than one-fortieth part (1 GHz) of a frequency to be extracted (for example, 40 GHz).

The first mixer 31 multiplies the high frequency component (around 40 GHz) passing through the first filter 14 by the high frequency component (39 GHz) of the oscillator 50, thereby generating sum and difference frequency components. The fourth filter 51 extracts the difference frequency component (1 GHz). The first filter 14 is structured so as to not transmit an unnecessary high frequency component (38 GHz) that generates the same frequency as the difference frequency component (1 GHz).

The second mixer 32 multiplies the high frequency component (40 GHz+around 50 MHz) passing through the third filter 13 by the high frequency component (39 GHz) of the oscillator 50, thereby generating sum and difference frequency components. The fifth filter 52 extracts the difference frequency component (1 GHz+50 MHz). The third filter 13 is structured so as not to transmit an unnecessary high frequency component (38 GHz−50 MHz) that generates the same frequency as the difference frequency component (1 GHz+50 MHz).

The third mixer 53 multiplies the frequency component (1 GHz) from the fourth filter 51 by the frequency component (1 GHz+50 MHz) from the fifth filter 52, thereby generating sum and difference frequency components. The sixth filter 54 extracts the difference frequency component (50 MHz) as a distance measuring signal. The distance measuring signal enters the phase difference measuring circuit 12.

The optical frequency comb has a wide frequency range. Therefore, the frequency component (wavelength) to be extracted from the received light signal in the measuring light receiving unit 6 may be set to be variable so as to measure a distance according to the measurement environment. Thus, the distance can be precisely measured even when the refractive index of the air is changed by changes in temperature and atmospheric pressure and by airborne substances and mist.

The phase difference measuring circuit 12 measures a phase difference between the reference signal and the distance measuring signal. The data of the phase difference is output to the distance measuring unit 17. The distance measuring unit 17 measures a distance based on the phase difference. When the phase difference is represented as $\Delta\phi$, a distance is represented as "D", a frequency is represented as "f", and the speed of light is represented as "C", the phase difference is $\Delta\phi = 4\pi DC$. The distance from the distance measuring device to the corner cube 8 is calculated as a difference between the internal reference light path "a" and the external measuring light path "b".

Figure 2:
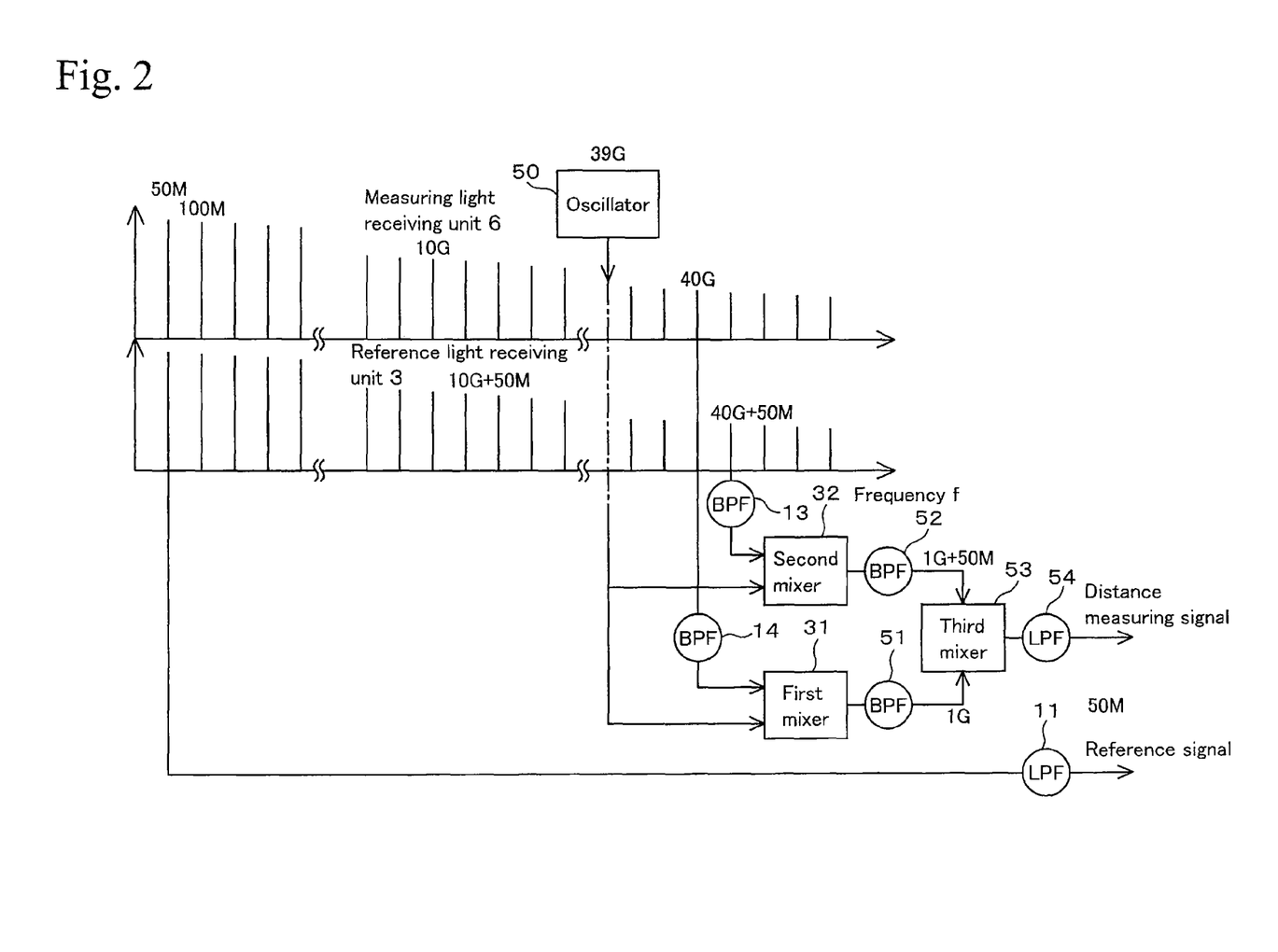
FIG. 2 is an explanatory diagram for describing a relationship between an optical frequency comb and frequency components to be extracted relating to the First Embodiment.
Figure 3:
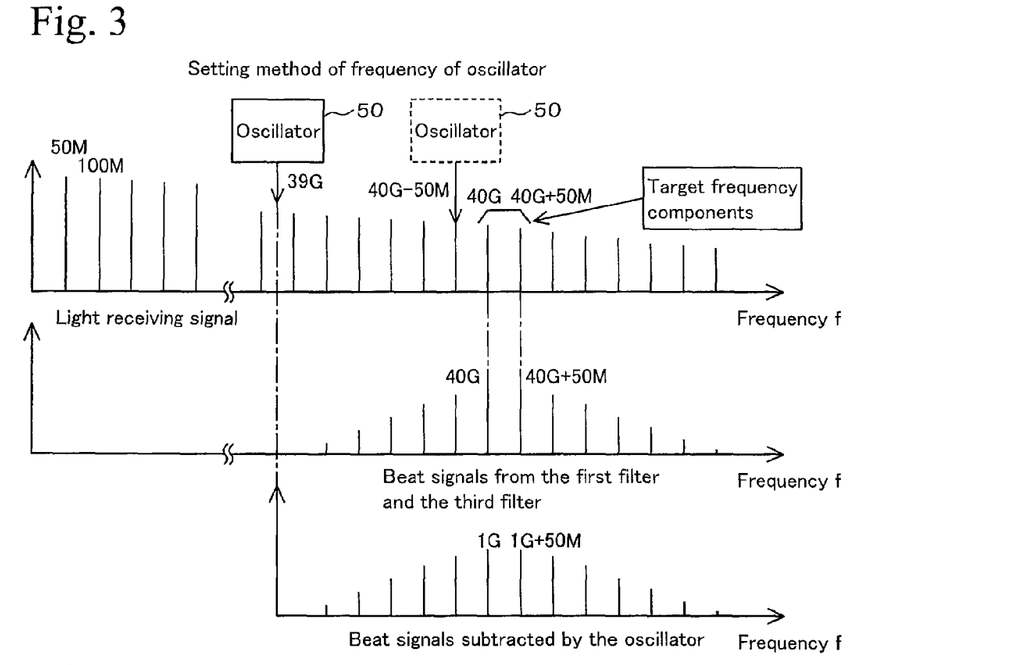
FIG. 3 is an explanatory diagram for describing a setting method of a frequency of an oscillator relating to the First Embodiment.

A setting method of the frequency of the oscillator 50 will be described hereinafter. FIG. 2 is an explanatory diagram for describing a relationship between an optical frequency comb and frequency components to be extracted. FIG. 3 is an explanatory diagram for describing a setting method of a frequency of an oscillator.

As shown in FIG. 2, it is assumed that 40 GHz in the frequency spectra of the optical frequency comb is used as a distance measuring signal. First, frequency components of around 40 GHz including the frequency component of 40 GHz are extracted from the received light signal in the measuring light receiving unit 6 by a bandpass filter (BPF: the first filter 14).

Next, frequency components of 40 GHz+around 50 MHz including a frequency component of 40 GHz+50 MHz are extracted from the received light signal of the reference light receiving unit 3 by a BPF (the third filter 13).

The frequency component (40 GHz) from the first filter 14 and the frequency component (40 GHz+50 MHz) from the third filter 13 are shown in the middle of FIG. 3.

As shown in FIG. 2, the frequency components of 40 GHz and 40 GHz+50 MHz are multiplied by the frequency (39 GHz) of the oscillator 50, respectively. Then, the difference frequency components (1 GHz and 1 GHz+50 MHz) are respectively extracted by BPFs (the fourth filter 51 and the fifth filter 52).

The frequency components (1 GHz and 1 GHz+50 MHz), in which the frequency (39 GHz) of the oscillator 50 is subtracted therefrom, are shown in the lower side of FIG. 3.

In the middle of FIG. 3, it is assumed that the frequency of the oscillator 50 is 40 GHz−50 MHz as an example. In this case, a frequency component having a lower beat signal than the frequency of the oscillator 50 is for example, 40 GHz−100 MHz. In addition, a frequency component having a higher beat signal than the frequency of the oscillator 50 is, for example, 40 GHz. When the frequency (40 GHz−50 MHz) of the oscillator 50 is subtracted from these frequency components, each of the frequency components generates a frequency component of 50 MHz.

In this case, the target frequency component (40 GHz) and the unnecessary frequency component (40 GHz−100 MHz) overlap. That is, the frequency components that are lower and higher than the frequency of the oscillator 50 are folded having zero at the frequency (40 GHz−50 MHz) of the oscillator 50 and are overlapped, thereby generating signal components.

In contrast, according to the First Embodiment, the frequency of the oscillator 50 is set so as to have a difference of not less than one-fortieth part of the target frequencies. In this case, the target frequencies are 40 GHz and 40 GHz+50 MHz and the difference is 1 GHz, whereby the frequency of the oscillator 50 is 39 GHz. The frequency of the oscillator 50 is set to be different from the range of the frequencies that pass through the first filter 14 and the third filter 13. Therefore, in the middle of FIG. 3, the frequency (39 GHz) of the oscillator 50 does not overlap with the frequency components (40 GHz and 40 GHz+50 MHz) of the beat signals extracted by the first filter 14 and the third filter 13.

Accordingly, as shown in the lower side of FIG. 3, when the target frequency components are beaten down by the oscillator 50, difference frequency components maintaining the target frequency components are generated. In this case, the target frequency components are 40 GHz and 40 GHz+50 MHz, and the frequency of the oscillator 50 is 39 GHz, whereby the difference frequency components are 1 GHz and 1 GHz+50 MHz. That is, the target frequency components (40 GHz and 40 GHz+50 MHz) are suitably beaten down.

Advantages of First Embodiment

Figure 4:
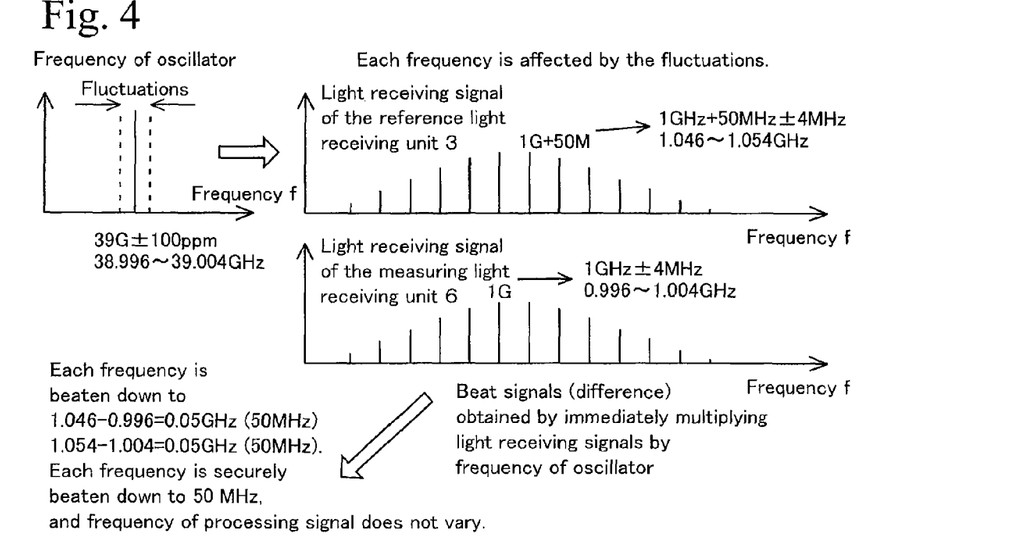
FIG. 4 is an explanatory diagram for describing a relationship between time fluctuations in the frequency of the oscillator and frequencies of processing signals relating to the First Embodiment.

Advantages of the First Embodiment will be described hereinafter. FIG. 4 is an explanatory diagram for describing a relationship between time fluctuations in the frequency of an oscillator and frequencies of processing signals.

As shown in FIG. 4, it is assumed that the frequency of the oscillator 50 includes fluctuations of ±100 ppm (from 38.996 to 39.004 GHz). In this case, the frequency component from the measuring light receiving unit 6 is from 0.996 to 1.004 GHz, and the frequency component from the reference light receiving unit 3 is from 1.046 to 1.054 GHz. Therefore, each of the frequency components is affected by the fluctuations. Nevertheless, in this embodiment, the frequency components from the measuring light receiving unit 6 are subtracted from the frequency components from the reference light receiving unit 3. The differences (50 MHz) of these frequency components are constant by the frequency interval (50 MHz) of the optical frequency comb. Therefore, the distance measuring signal (processing signal) is securely beaten down to 50 MHz.

Thus, according to the First Embodiment, even when the frequency of the oscillator 50 fluctuates, the frequency of the processing signal does not vary, whereby the phase difference between the distance measuring signal and the reference signal is stably measured.

2. Second Embodiment

A modification of the First Embodiment will be described hereinafter. In the Second Embodiment, the distance measuring device does not include the first filter 14 and the third filter 13 in FIG. 1. Otherwise, in the Second Embodiment, the distance measuring device is structured so as to decrease the performances of the first filter 14 and the third filter 13 in FIG. 1. The descriptions for components of the Second Embodiment similar to those of the First Embodiment are omitted in the following.

Figure 5:
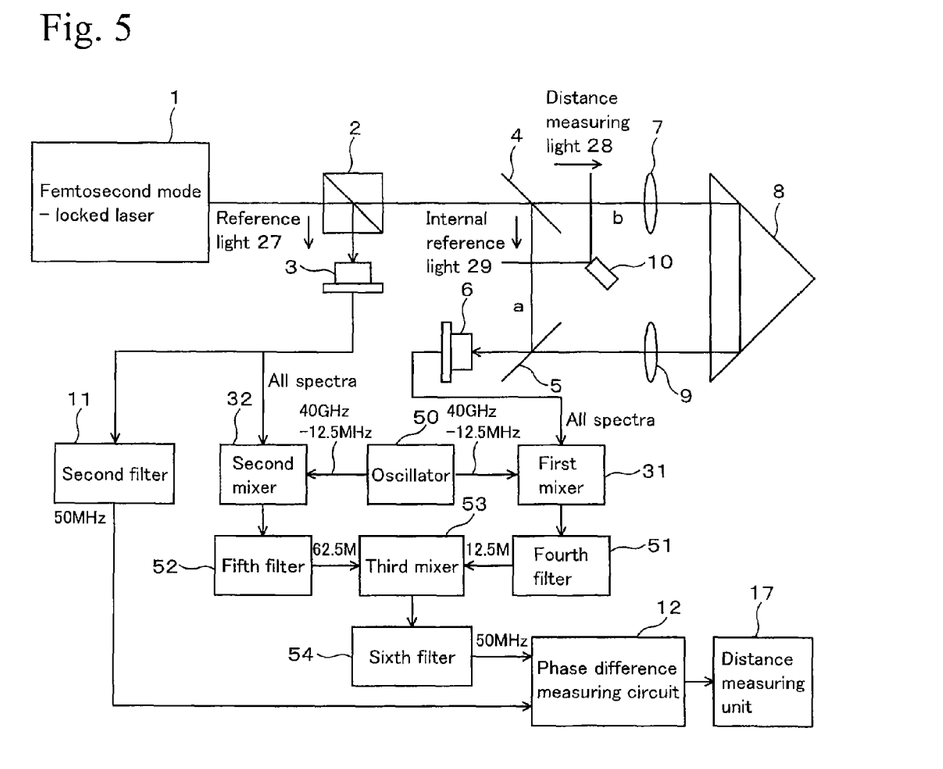
FIG. 5 is a block diagram of a distance measuring device relating to a second embodiment.

FIG. 5 is a block diagram of a distance measuring device relating to the Second Embodiment. It is assumed that 40 GHz in the frequency spectra of the optical frequency comb is used as a distance measuring signal. The frequency of the oscillator 50 is set to be different from a target frequency by a quarter of a frequency interval of the optical frequency comb. The target frequency is extracted from the received light signal in the measuring light receiving unit 6. For example, when the target frequency is 40 GHz, and the frequency interval is 50 MHz, the frequency of the oscillator 50 is set to be 40 GHz−12.5 MHz. The setting method of the frequency of the oscillator 50 will be described later.

The first mixer 31 outputs sum and difference frequency components of the received light signal (all spectra) of the measuring light receiving unit 6 and the frequency (40 GHz−12.5 MHz) of the oscillator 50, to the fourth filter 51. The fourth filter 51 extracts a frequency component of 12.5 MHz from the difference frequency components.

The second mixer 32 outputs sum and difference frequency components of the received light signal (all spectra) of the reference light receiving unit 3 and the frequency (40 GHz−12.5 MHz) of the oscillator 50, to the fifth filter 52. The fifth filter 52 extracts a frequency component of 62.5 MHz from the difference frequency components.

The third mixer 53 multiplies the frequency component of 12.5 MHz by the frequency component of 62.5 MHz and outputs sum and difference frequency components to the sixth filter 54. The sixth filter 54 outputs the difference frequency component (50 MHz) to the phase difference measuring circuit 12 as a distance measuring signal.

The phase difference measuring circuit 12 inputs the distance measuring signal (50 MHz) extracted by the sixth filter 54 and the reference signal (50 MHz) extracted by the second filter 11. The processing in the phase difference measuring unit 12 and the distance measuring unit 17 is the same as the case in the First Embodiment.

Figure 6:
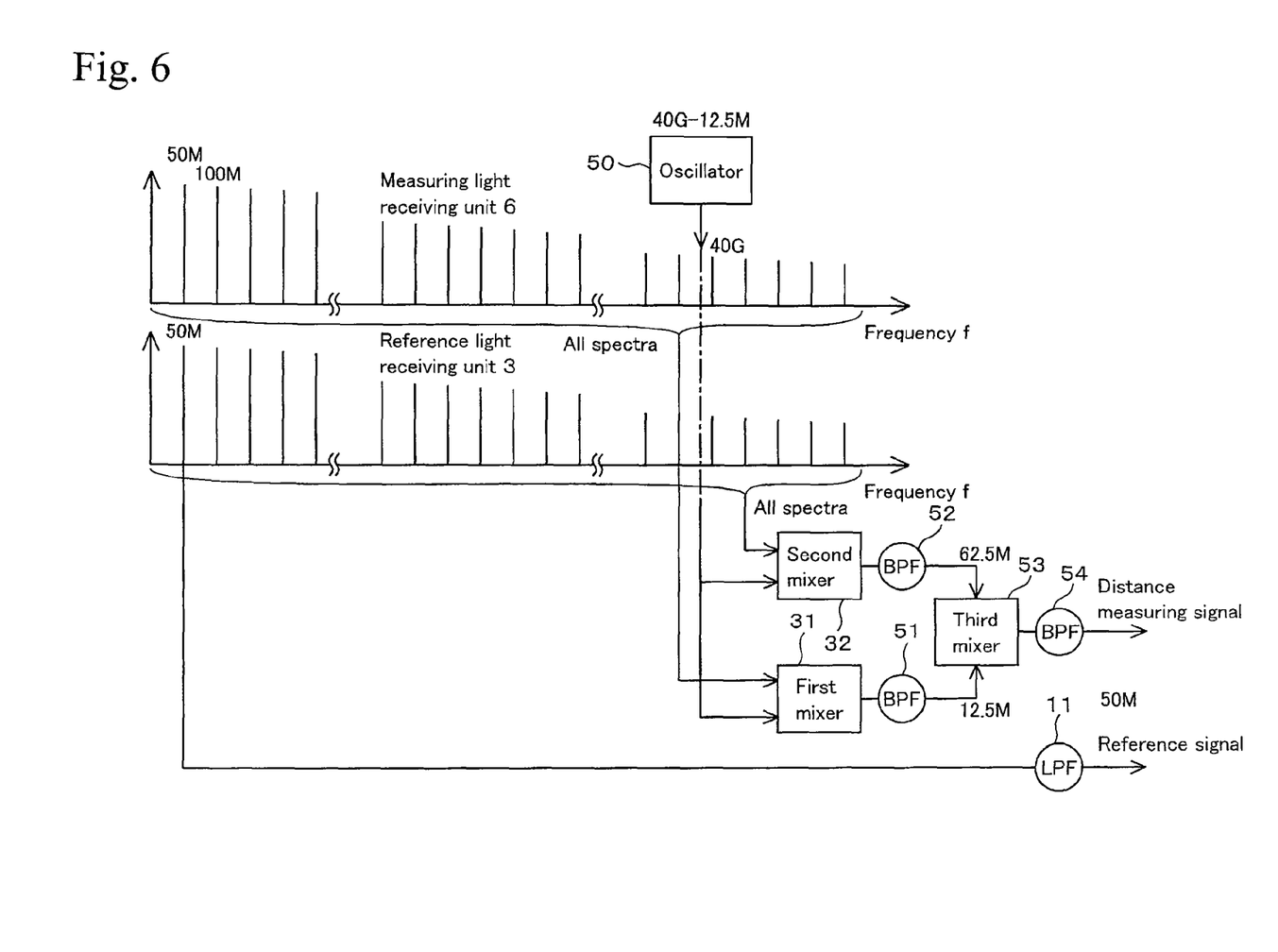
FIG. 6 is an explanatory diagram for describing a relationship between an optical frequency comb and frequency components to be extracted relating to the Second Embodiment.
Figure 7:
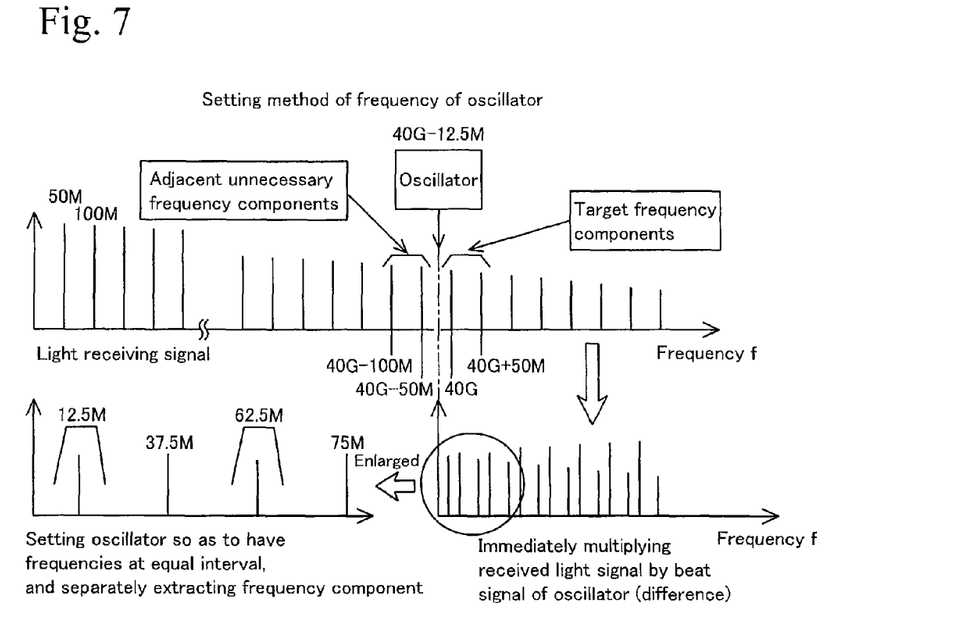
FIG. 7 is an explanatory diagram for describing a setting method of a frequency of an oscillator relating to the Second Embodiment.

The setting method of the frequency of the oscillator will be described hereinafter. FIG. 6 is an explanatory diagram for describing a relationship between an optical frequency comb and frequency components to be extracted. FIG. 7 is an explanatory diagram for describing a setting method of a frequency of an oscillator.

As shown in FIG. 6, it is assumed that 40 GHz in the frequency spectra of the optical frequency comb is used as a distance measuring signal. First, a received light signal (all spectra) of the measuring light receiving unit 6 is multiplied by the frequency (40 GHz−12.5 MHz) of the oscillator 50, thereby generating sum and difference frequency components. Then, a frequency component of 12.5 MHz is extracted from the difference components by the BPF (the fourth filter 51).

Moreover, the received light signal (all spectra) of the reference light receiving unit 3 is multiplied by the frequency (40 GHz−12.5 MHz) of the oscillator 50, thereby generating sum and difference frequency component. Then, a frequency component of 62.5 MHz is extracted from the difference frequency components by the BPF (the fifth filter 52).

The received light signals (all spectra) of the measuring light receiving unit 6 and the reference light receiving unit 3 are immediately multiplied by the frequency (40 GHz−12.5 MHz) of the oscillator 50. In this case, the obtained difference frequency components are shown on the right of the lower side of FIG. 7.

The difference frequency components shown on the right of the lower side of FIG. 7 are signal components in which unnecessary frequency components are folded over the target frequency components (40 GHz and 40 GHz+50 MHz) having zero at the frequency (40 GHz−12.5 MHz) of the oscillator 50. The unnecessary frequency components are lower than the frequency (40 GHz−12.5 MHz) of the oscillator 50.

The unnecessary frequency components (for example, 40 GHz−50 MHz and 40 GHz−100 MHz) must be folded without overlapping the target frequency components (40 GHz and 40 GHz+50 MHz). Therefore, in the upper side of FIG. 7, the frequency of the oscillator 50 must be different from integral multiple of a half of the frequency interval (50 MHz) of the optical frequency comb (1/n (n≠1, 2)). That is, it is necessary that the frequency of the oscillator 50 is set to have a difference of 1/n (n≠1, 2) of the frequency interval of the optical frequency comb with respect to the beat signal output from the measuring light receiving unit 6. If the frequency of the oscillator 50 is an integral multiple of the half of the frequency interval of the optical frequency comb, the frequency components that are lower and higher than the frequency of the oscillator 50 overlap. Therefore, the target frequency components are not maintained.

An enlarged view of the difference frequency components is shown on the left of the lower side of FIG. 7. The target frequency components (40 GHz and 40 GHz+50 MHz) are beaten down by the frequency (40 GHz−12.5 MHz) of the oscillator 50. Therefore, as shown on the left of the lower side of FIG. 7, the target frequency components come to 12.5 MHz and 62.5 MHz, respectively. The unnecessary frequency components (40 GHz−50 MHz and 40 GHz−100 MHz) come to 37.5 MHz and 75 MHz, respectively.

In order to easily extract the target frequency components (12.5 MHz and 62.5 MHz) by the BPFs (the fourth filter 51 and the fifth filter 52), the intervals between the difference frequency components are preferably equal, as shown on the left of the lower side of FIG. 3. Therefore, the frequency of the oscillator 50 is set to have a difference of ¼ of the frequency interval of the optical frequency comb with respect to the target frequency to be extracted as a distance measuring signal. In this case, the target frequency is 40 GHz, and the frequency interval is 50 MHz, whereby the frequency of the oscillator 50 is 40 GHz−12.5 MHz. The frequency of the oscillator 50 is not limited to the frequency having a difference of ¼ of the frequency interval of the optical frequency comb with respect to the target frequency. That is, the frequency of the oscillator 50 may be set to have a difference of ¼ of the frequency interval of the optical frequency comb with respect to the beat signal output from the measuring light receiving unit 6.

In the Second Embodiment, the first filter 14 and the third filter 13 in the First Embodiment are not used. Otherwise, the distance measuring device in the Second Embodiment may be structured to use the first filter 14 and the third filter 13. In this case, the performances of the first filter 14 and the third filter 13 can be decreased.

Advantages of Second Embodiment

Figure 8:
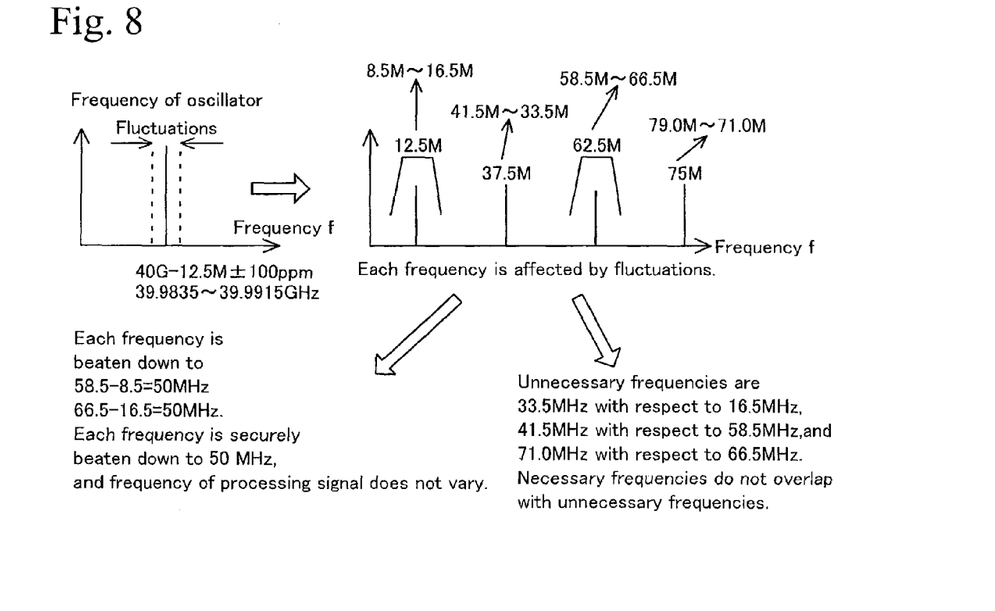
FIG. 8 is an explanatory diagram for describing a relationship between time fluctuations in the frequency of the oscillator and frequencies of processing signals relating to the Second Embodiment.

Advantages of the Second Embodiment will be described hereinafter. FIG. 8 is an explanatory diagram for describing a relationship between time fluctuations in the frequency of the oscillator and frequencies of processing signals.

As shown in FIG. 8, it is assumed that the frequency of the oscillator 50 includes fluctuations of ±100 ppm (from 39.9835 to 39.9915 GHz). The frequency component from the measuring light receiving unit 6 is from 8.5 to 16.5 MHz, and the frequency component from the reference light receiving unit 3 is from 58.5 to 66.5 MHz. These frequencies are greatly affected by the fluctuations. Nevertheless, in this embodiment, the frequency components from the measuring light receiving unit 6 are subtracted from the frequency components from the reference light receiving unit 3. The differences (50 MHz) of these frequency components are constant by the frequency interval (50 MHz) of the optical frequency comb. Therefore, the distance measuring signal (processing signal) is securely beaten down to 50 MHz.

Moreover, the frequency of the oscillator 50 is set to have a difference of ¼ of the frequency interval of the optical frequency comb with respect to the beat signal (40 GHz) output from the measuring light receiving unit 6. Accordingly, the characteristics of the fourth filter 51 and the fifth filter 52 can be efficiently set so as to select the necessary frequencies of 12.5 MHz and 62.5 MHz and to remove the unnecessary frequencies of 37.5 MHz and 75.0 MHz. In addition, the selection of the necessary frequencies and the removal of the unnecessary frequencies are easily performed.

Thus, according to the Second Embodiment, even when the frequency of the oscillator 50 fluctuates, the frequency of the processing signal does not vary, whereby the phase difference between the distance measuring signal and the reference signal is stably measured. Moreover, the selection and the removal of the frequencies are easily performed.

INDUSTRIAL APPLICABILITY

The present invention can be used for a distance measuring device that measures a distance based on a phase difference of at least two periodic signals by using an optical frequency comb.

What is claimed is:

1. A distance measuring device comprising:
   a laser unit for generating an optical frequency comb as a laser light flux;
   a dividing device for dividing the laser light flux into reference light and distance measuring light;
   a reference light receiving unit for receiving the reference light and outputting multiple beat signals;
   a measuring light receiving unit for receiving the distance measuring light and outputting multiple beat signals having frequency components to be extracted;
   an oscillator for oscillating a periodic signal having a frequency that is different from the frequency components extracted from the beat signals of the measuring light receiving unit;
   a first mixer for generating sum and difference frequency components of the beat signal from the measuring light receiving unit and the periodic signal oscillated by the oscillator;
   a second mixer for generating sum and difference frequency components of the beat signal from the reference light receiving unit and the periodic signal oscillated by the oscillator;
   a fourth filter for extracting a beat signal having the difference frequency component from the frequency components generated by the first mixer;
   a fifth filter for extracting a beat signal having a frequency component, which is different from the frequency component extracted by the fourth filter, from the frequency components generated by the second mixer;
   a third mixer for generating sum and difference frequency components of the beat signal extracted by the fourth filter and the beat signal extracted by the fifth filter;
   a sixth filter for extracting a beat signal having the difference frequency component from the frequency components generated by the third mixer;
   a second filter for extracting a beat signal having the same frequency component as the frequency component extracted by the sixth filter, from the beat signals of the reference light receiving unit;
   a phase difference measuring unit for measuring a phase difference of the two beat signals extracted by the sixth filter and the second filter; and
   a distance measuring unit for measuring a distance based on the phase difference measured by the phase difference measuring unit.

2. The distance measuring device according to claim 1, wherein the first mixer and the second mixer immediately multiply the multiple beat signals from the measuring light receiving unit and the reference light receiving unit by the periodic signal of the oscillator, respectively.

3. The distance measuring device according to claim 1, wherein the frequency of the oscillator has a difference of 1/n (n≠1, 2) of frequency interval of the optical frequency comb with respect to the beat signal of the measuring light receiving unit.

4. The distance measuring device according to claim 1, wherein the frequency of the oscillator has a difference of ¼ of frequency interval of the optical frequency comb with respect to the beat signal of the measuring light receiving unit.

5. The distance measuring device according to claim 1, wherein the signal components generated by the first mixer and the second mixer have frequency spectra at equal interval.

6. The distance measuring device according to claim 1, further comprising:
   a first filter for extracting at least one beat signal from the measuring light receiving unit; and
   a third filter for extracting at least one beat signal from the reference light receiving unit,
   wherein the first mixer generates sum and difference frequency components of the beat signal from the first filter and the periodic signal oscillated by the oscillator, and the second mixer generates sum and difference frequency components of the beat signal from the third filter and the periodic signal oscillated by the oscillator.

7. The distance measuring device according to claim 6, wherein the frequency of the oscillator is different from ranges of frequencies passed through the first filter and the third filter.

* * * * *